United States Patent [19]

Schmidt et al.

[11] 4,443,592

[45] Apr. 17, 1984

[54] METHOD FOR MAKING POLYETHERIMIDE

[75] Inventors: Lawrence R. Schmidt, Schenectady; Eric M. Lovgren, Westerlo; Peter G. Meissner, Berne, all of N.Y.

[73] Assignee: General Electric Company, Schenectady, N.Y.

[21] Appl. No.: 459,850

[22] Filed: Jan. 21, 1983

[51] Int. Cl.$^3$ .............................................. C08G 73/10
[52] U.S. Cl. ................................... 528/128; 264/349; 526/65; 526/66; 528/26; 528/28; 528/125; 528/126; 528/173; 528/179; 528/185; 528/188; 528/351; 528/352; 528/353
[58] Field of Search ..................... 526/65, 66; 264/349; 528/26, 28, 125, 126, 128, 173, 179, 183, 188, 351-353

[56] References Cited

U.S. PATENT DOCUMENTS 4,011,198  3/1977  Takekoshi et al. .................. 528/28
4,073,773  2/1978  Banucci et al. ..................... 528/211

*Primary Examiner*—Lester L. Lee
*Attorney, Agent, or Firm*—William A. Teoli; James C. Davis, Jr.; James Magee, Jr.

[57] ABSTRACT

Polyetherimides are formed by the blending of a first melt of organic dianhydride and a second melt of organic diamine and the resulting blend is polymerized in a continuous, steady state manner, employing an extruder reactor as the reaction chamber. The extruder reactor is provided with means for heating, evacuation of water of reaction, and transfer sections in order to achieve the steady state necessary for continuous production of a substantially uniform polyimide.

27 Claims, 2 Drawing Figures

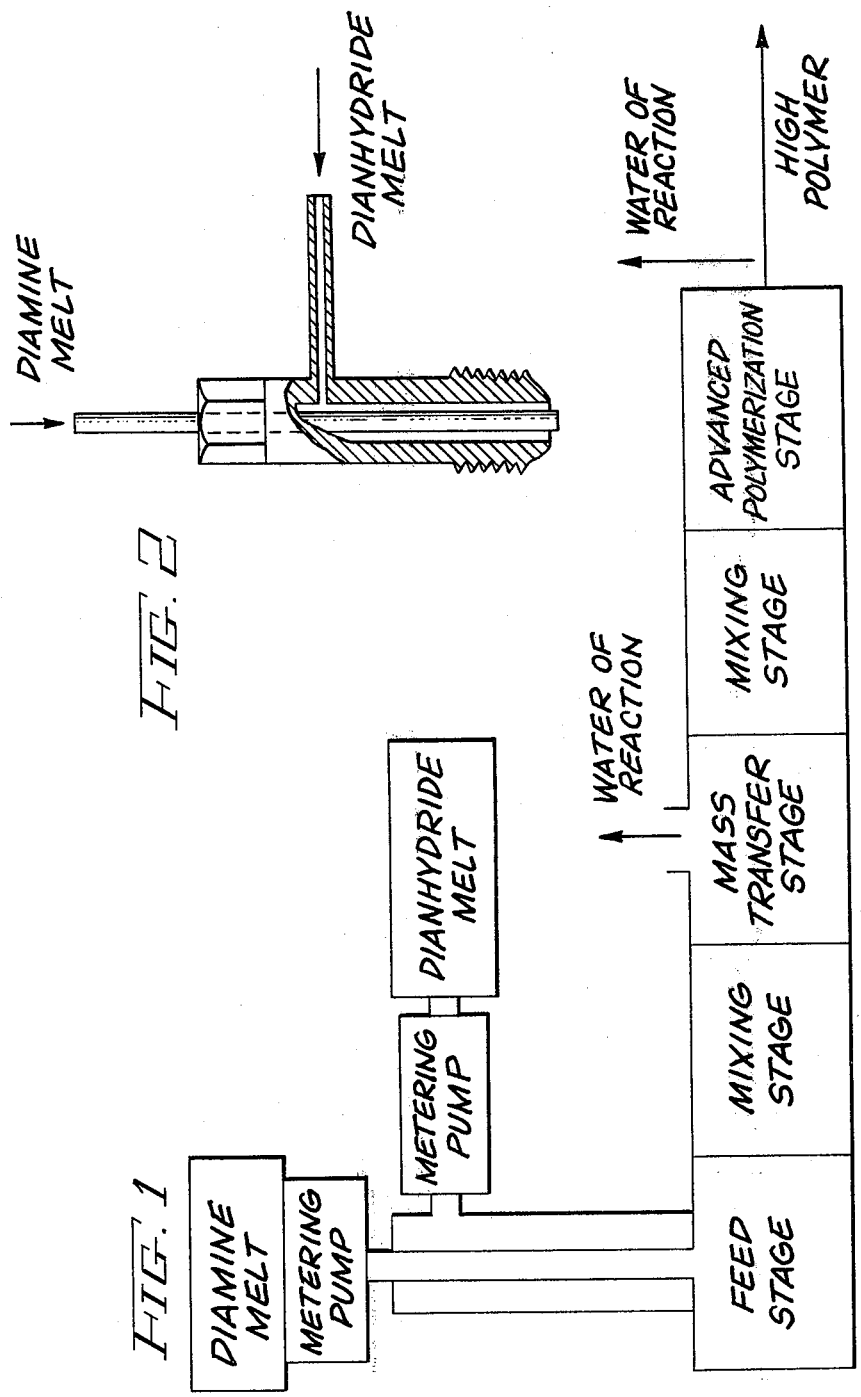

METHOD FOR MAKING POLYETHERIMIDE

CROSS REFERENCE TO RELATED APPLICATIONS

Reference is made to copending applications of Lawrence R. Schmidt et al, Ser. No. 459,851 for Apparatus Used in Monomer Polymerization and Ser. No. 459,849, for Polymerization Process, where all of the aforementioned applications are filed concurrently herewith, incorporated herein by reference and assigned to the same assignee as the present invention.

BACKGROUND OF THE INVENTION

The present invention relates to a continuous method for making polyetherimide, based on the introduction of molten aromatic bis(ether anhydride) and molten organic diamine into an extruder reactor.

Prior to the present invention, as shown in Takekoshi et al, U.S. Pat. No. 4,011,198, incorporated herein by reference and assigned to the same assignee as the present invention, there is provided a method for making polyetherimides by effecting reaction at melt polymerization temperatures between an aromatic bis(ether anhydride), or "organic dianhydride" and an organic diamine in an extruder. The organic dianhydride has the formula,

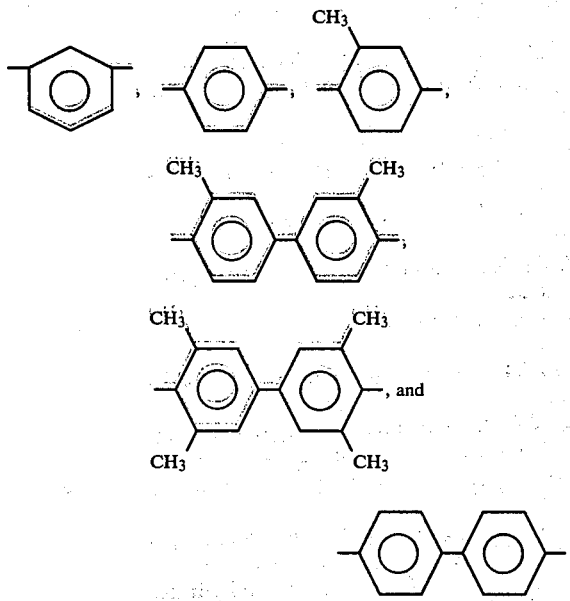

(1)

and the organic diamine has the formula, $H_2N-R^1-NH_2$, (2)

where R is a member selected from

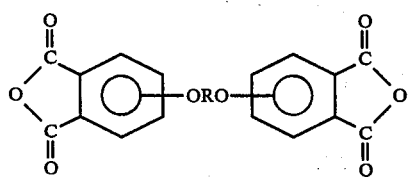

and divalent organic radicals of the general formula,

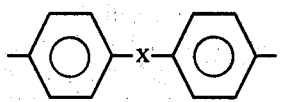

X is a member selected from the class consisting of divalent radicals of the formula,

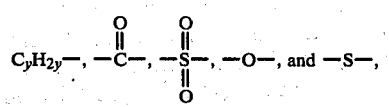

y is an integer from 1 to 5; and $R^1$ is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

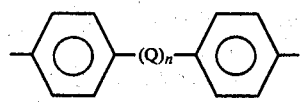

Q is a member selected from the class consisting of

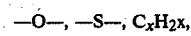

x is an integer from 1 to 5 and n is 0 or 1.

Further improvements in the melt polymerization of mixtures of organic dianhydride of formula (1) and organic diamine of formula (2) to make polyetherimide are shown by Banucci et al U.S. Pat. No. 4,073,773, incorporated herein by reference and assigned to the same assignee as the present invention. Banucci et al show the introduction of a powdered mixture of organic diamine and aromatic bis(ether anhydride) into an inlet opening of a screw extruder. The powdered mixture of organic diamine and aromatic bis(ether anhydride) were blended in certain proportions and attempts were made to maintain the powdered mixture as uniform as possible. The preformed powdered blend was passed through a first extruder zone maintained at a low temperature to a zone where the mixture was melted and water of reaction was removed.

Although the methods of Takekoshi et al and Banucci et al provide procedures for making polyetherimide in an extruder by melt polymerization of a mixture of organic dianhydride of formula (1) and organic diamine of formula (2), steady state conditions required for continuous production of polyetherimide by melt polymerization are often difficult to achieve. The temperature profile of monomer solids initially introduced into the extruder have to be carefully monitored prior to the venting of water of reaction to avoid plugging of the monomer feed in the extruder. The conversion of the solid monomers to the molten state can occur in Banucci et al at the mass transfer stage where water is evacuated. This procedure can interfere with the creation of steady state conditions in the extruder and optimum polymerization conditions for making polyetherimide.

The present invention is based on the discovery that steady state conditions suitable for polyetherimide formation in a continuous manner can be achieved by separately introducing into a screw extruder organic dianhydride of formula (1) and organic diamine of formula (2) in the liquid state in particular proportions, thereafter further kneading the aforementioned ingredients in the molten state prior to conveying the resulting liquid to a mass transfer stage to effect the separation of water of reaction.

It has been found that optimum results can be achieved with respect to the introduction of liquid organic dianhydride of formula (1) and organic diamine of formula (2) by employing a concentric feed pipe as shown in FIG. 2 and copending application Ser. No. 459,851 to allow for the controlled metering of organic dianhydride and organic diamine. Surprisingly, initial contact between the molten organic diamine at temperatures in the range of from 200° C. to 275° C. at pressures of up to about 2 atmospheres, does not result in reaction by-products based on the instantaneous intercondensation between the organic diamine and the organic dianhydride, which would impede forward material flow and impair ultimate polymer properties. A two-phase liquid mixture is formed which can be kneaded and conveyed to a mixing stage at even higher temperatures and pressures without substantially affecting ultimate polymer properties prior to the evacuation of water of reaction. As shown hereinafter, particular proportions between the organic dianhydride and the organic diamine, and certain blending conditions the organic dianhydride and organic diamine can provide polyetherimide having optimum properties.

STATEMENT OF THE INVENTION

There is provided a process for making polyetherimide in a continuous manner which comprising
(1) metering molten aromatic bis(ether anhydride) and molten organic diamine into an extruder reactor to produce a two-phase viscous melt,
(2) conveying the two-phase liquid mixture of (1) to a mixing stage which effects a high degree of contact between the molten aromatic bis(ether anhydride) and molten organic diamine as a result of intense kneading of the ingredients of the mixture,
(3) conveying the resulting viscous melt of (2) to a mass transfer stage, where water of reaction is separated from the surface of the partially polymerized polyetherimide melt,
(4) thereafter conveying the resulting melt to additional high shear and intensive mixing at a temperature in the range of from 300° C. to 350° C. and a pressure of from 1 to 5 atmospheres, and
(5) separating high molecular weight polyetherimide therefrom along with the removal of final water of reaction, In addition to the organic anhydride of formula (1), the organic anhydrides utilized in the practice of the present invention also can include mixtures of aromatic bis(ether anhydride) of formula (1) and up to 30 mole percent of benzophenone dianhydride.

Included by the organic dianhydrides of formula (1) are compounds such as

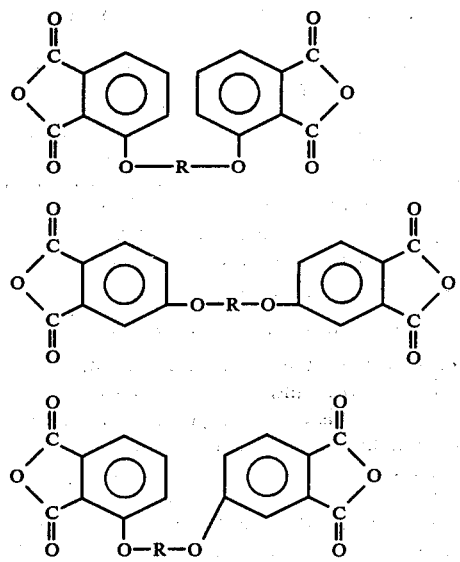

where R is defined above. A preferred form of R is

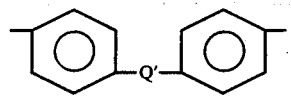

where Q' is selected from

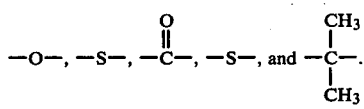

Aromatic bis(ether anhydride)s of formula (1) include for example,
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride
4,4'-bis(2,3-dicarboxyphenoxy)benzophenone dianhydride;
4,4'-bis(2,3-dicarboxyphenoxy)diphenyl sulfone dianhydride
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride,
etc., and mixtures of such bisether anhydrides Additional aromatic bis(ether anhydride)s also included by formula (1) are shown by M. M. Koton, F. S.

Florinski, M. I. Bessonov, A. P. Rudakov (Institute of Heteroorganic Compounds, Academy of Sciences USSR) USSR 257,010, Nov. 11, 1969, Appl. May 3, 1967, and M. M. Koton, F. S. Florinski, Zh. Org. Khin. 4(5) 774 (1968).

Bis(etheranhydride)s preferred herein are: 2,2-bis[4-(2,3-dicarboxyphenoxy)phenyl]propane dianhydride; 2,2-bis[4-(3,4-dicarboxyphenoxy)phenyl]propane dianhydride; 4-(2,3-dicarboxyphenoxy)-4'-(3,4-dicarboxyphenoxy)diphenyl-2,2-propane dianhydride and mixtures thereof.

Some of the aromatic bis(etheranhydride) compounds of formula (1) are shown in U.S. Pat. No. 3,972,902 (Heath and Wirth).

Included by the organic diamines of formula (2) are for example,
m-phenylenediamine;
p-phenylenediamine;
4,4'-diaminodiphenylpropane;
4,4'-diaminodiphenylmethane (4,4'-methylenedianiline);
benzidine;
4,4'-diaminodiphenyl sulfide;
4,4'-diaminodiphenyl sulfone;
4,4'-diaminodiphenyl ether (4,4'-oxydianiline);
1,5-diaminonaphthalene;
3,3'dimethylbenzidine;
3,3'-dimethoxybenzidine;
2,4-bis(-amino-t-butyl)toluene;
bis(p--amino-t-butylphenyl)ether;
bis(p--methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis-(4-aminocyclohexyl)methane;
3-methylhaptamethylenediamine;
4,4-dimethylhaptamethylenediamine;
2,11-dodecanediamine;
2,2-dimethylropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methlnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane,
etc., and mixtures of such diamines.

Organic diamines preferred herein as m-phenylenediamine; 4,4'-oxydianiline 4,4'-methylenedianiline; and mixtures thereof.

The polyetherimides made in accordance with the practice of the present invention consist essentially of the following chemically combined units,

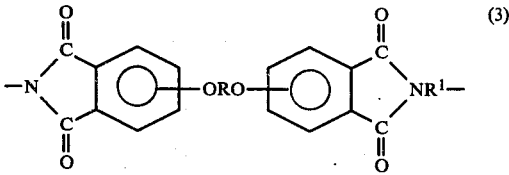

where R and R$^1$ are as previously defined. These polymers can be blended with various fillers, such as silica fillers, glass fibers, carbon whiskers, perlite, etc. The resulting filled compositions can have a proportion of from 1 part to 70 part of filler per hundred part of polyetherimide.

In accordance with the practice of the present invention, organic dianhydride of formula (1) and organic diamine of formula (2) are separately maintained in the molten state under non-oxidizing conditions, for example, under an inert gas such as nitrogen, or argon, and introduced into an extruder in a controlled manner. A suitable chain stopper in the molten state or in liquid form can be introduced simultaneously into the extruder along with the organic dianhydride and organic diamine. Advantageously, if the chain stopper is an organic dianhydride, for example phthalic anhydride, it can be initially dry-blended with the organic dianhydride prior to melting. A suitable means can be employed to minimize initial contact between the molten organic dianhydride and molten organic diamine which avoids flash evaporation of the organic diamine and minimize excessive oxidation.

Preferably, the molten organic diamine can be introduced as a separate stream within a protective surrounding outer stream of the organic dianhydride which can serve to protect the organic diamine from excessive oxidation.

The rate of introduction of the molten organic dianhydride and organic diamine can be readily controlled by appropriate metering devices. Advantageously, these metering devices allow for carefully controlling the proportions of the organic dianhydride reactant, chain stopper and organic diamine under continuous polymerization conditions offering significant advantages over methods based on the introduction of solid premixed blends of powdered organic dianhydride, chain stopper and organic diamine which must be premixed in substantially large amounts to maintain continuous polymerization conditions over an extended period of time. While it is preferred to use the organic dianhydride and the organic diamine in substantially stoichiometric amounts, effective results can be achieved if there is used from about 0.5 to 2 moles of organic diamine per mole of organic dianhydride.

A significant feature of the present invention resides in the ability to effect a high degree of contact between the organic dianhydride and organic diamine and optionally chain stopper when the two-phase molten mixture is conveyed from the feed stage into the mixing stage. Unless a proper dispersion of the ingredients are achieved during the mixing stage, the viscous melt, which represents a preliminary intercondensation reaction product of the reactants, will not be ready for rapid intercondensation to produce higher molecular weight polymer and will retard the removal of the by-product of water of reaction when initially vented in the subsequent mass transfer stage. A high degree of organic diamine and organic dianhydride dispersion can be accomplished by breaking up the organic diamine stream from the initial feed stage and generating a high surface area to volume resulting in a large interfacial area for initial reaction in the mixing stage. This also aids in maintaining the proper stoichiometric ratio of monomers. In addition to the heating of the materials accomplished by proper jacketing of the extruder through means known to the art, heat is also generated by frictional or viscous heating, based on the motion of various molecules against each other. An intense degree of mixing and kneading of the two-phase viscous melt can be maintained in the mixing stage if a twin screw extruder is utilized employing forward flow kneading block elements. The degree of mixing can be further defined by the following mixing factor F as follows:

$F = S_T S_A$ where $S_T$ is the mean transverse strain imparted to the fluid between mixing elements and $S_A$ is the mean axial strain imparted to the fluid in the mixing stage. This formula applies to various types of extruders and mixing devices.

Different designs of melt conveying elements can be used in the feed stage in instances where a twin screw-extruder is utilized. The value of F can have a value of 1 to $10^5$ and preferably $2 \times 10^4$ to $6 \times 10^4$.

From the feed stage, where polymerization is initiated, the two-phase liquid is conveyed to the mixing stage as previously discussed where both temperature and pressure are increased. Here, there is further polymerization and in this second, or mixing stage, zero and forward conveying kneading blocks are employed.

The now partially polymerized material is conveyed from the mixing stage to a mass transfer stage. The mass transfer stage of the extruder employs open and medium pitch forward conveying elements and achieves a melt pool acceleration. This increases the surface area of the partially polymerized material so that, in combination with the fact that this stage of the extruder is vented, a major proportion of the water of reaction is vented. Reaction temperature is maintained and closely controlled in this mass transfer stage which operates, essentially, at atmospheric pressure.

The material is conveyed from the mass transfer stage to a fourth, or second mixing stage where there is melt pool deceleration and further polymerization. The screw elements in this fourth stage are tight pitch, forward conveying elements.

From the mixing stage, the material is conveyed to an advanced polymerization stage where there is an extended residence time with intensive mixing and increase in temperature and pressure. The elements in this fifth, or advanced polymerization, stage are tight pitch, forward conveying elements and the outlet of the fifth stage is restricted, as with a die. Upon exiting the advanced polymerization stage, the high polymer is obtained and the additional water of reaction is vented. The intrinsic viscosity of the polyetherimide achieved is generally from about 0.1 to 0.3 dl/g in chloroform. If the lengths of the stage in the extruder are increased, without other changes, intrinsic viscosities of 0.50 dl/g in chloroform, and even higher, are possible.

Because of the design of the extruder, as set forth above, an engineering steady state, continuous process is possible. The conditions attained in the various stages of the extrusion polymerization particularly temperature, required appropriate use of external heating and cooling means placed along the extruder barrel by means known to those skilled in the art.

It is this achievement of engineering steady state conditions, allowing for predictable continuous processing which distinguishes the present invention from processes of the prior art.

In the accompanying drawings, there is shown in schematic at

FIG. 1, an extruder for use in accordance with the process of the present invention and in FIG. 2, a feed pipe which can be used to introduce molten organic dianhydride and molten organic diamine is schematically illustrated.

More particularly, a Werner-Pfleiderer twin screw extruder Model ZDS-K28 can be employed. The elements within the extruder can be set up in accordance with the polymerization process of the present invention.

In order that those skilled in the art will be better able to practice the invention, the following examples are given by way of illustration and not by way of limitation. All parts are by weight.

In accordance with the specific runs made in accordance with the present invention, a mixture of bisphenol-A dianhydride and 3%, based upon the total components, of phthalic anhydride were fed to first melting stage, a jacketed liquid holding tank purged with argon. The mixture was heated to 210° C. In a second melting stage, m-phenylenediamine was fed and heated about 70° C.

The above organic dianhydride and organic diamine are fed into the extruder using metering pumps. The metering pumps are controlled by means known in the art, to deliver a mixture of the organic dianhydride and organic diamine by controlling the rpm of the individual pumps through proper gearing arrangements. Two streams are joined at the inlet to feed stage and actually merge immediately adjacent the screw or screws of the extruder. In the runs carried out in accordance with the present invention, Zenith gear pumps were employed to feed a stoichiometric ratio of the dianhydride and the diamine to feed stage. The temperature in the feed stage was maintained at from 200° to 275° C. at from 1 to 2 atmospheres. As indicated, the elements in this feed stage are melt conveying, tight pitch elements.

The molten material, which has already begun to react, is conveyed to the mixing stage where it is acted upon by zero and forward conveying kneading blocks. Viscous heating is accomplished in this section and the temperature is maintained at from 200° to 350° C. and the pressure is increased to from 2 to 6 atmospheres. Preferably, the temperature is maintained at from 250° to 350° C. and the pressure at from 2 to 3 atmospheres.

In the mixing stage, a substantial amount of the reaction between the dianhydride and diamine is accomplished, resulting in the generation of water. This water is removed in the following mass transfer stage, so as to prevent impeding of further reaction.

The partially polymerized polyetherimide is conveyed from the mixing stage to the mass transfer stage where it is acted upon by open and medium pitch forward conveying elements. Because of the type of elements, there is a melt pool acceleration with a generated interfacial area of the polymer, employing an extruder with a chamber diameter of 28 mm, of from 25 to 30 in.$^2$/min. The temperature in this stage is maintained at from 250° to 325° C. and, because the stage is vented, pressure is essentially atmospheric. Preferably, the temperature in this stage is at from 300° to 325° C.

The extruder is vented in the mass transfer stage to allow for the removal of water to permit further reaction between the components. From about 60 to 70% of the water to ultimately be produced is removed at this stage.

The generated interfacial area in mass transfer stage is determined by idealizing each of the intermeshing screws of a twin screw extruder, each chamber having a diameter 28 mm. Under these conditions, the generated interfacial areas shown can be obtained. The accuracy of the idealization was confirmed by observation of the state of the polymer on the screws when those screws are pulled immediately upon termination of a run.

If desired, the further polymerized material can be conveyed from the mass transfer stage to a second mixing stage where there is a melt pool deceleration or directly to an advanced polymerization step. The temperature in the mixing stage is maintained at from 250° to 350° C. and the pressure is maintained at from 1 to 2 atmospheres employing tight pitch forward conveying elements or flights. Preferably, the temperature in the mixing stage is from 300° to 350° C.

From the second mixing stage, the partially polymerized material is conveyed to an advanced polymerization stage. The advanced polymerization stage is provided with tight pitch, forward conveying elements or flights, and the outlet of the advanced polymerization stage is restricted, such as by a die. In this advanced polymerization stage, there is an extended residence time to complete the polymerization of the polyetherimide. The temperature is maintained in the advanced polymerization stage at from 300° to 400° C., preferably from 325° to 400° C., and the pressure can range from 1 to 50 atmospheres, preferably from 1 to 25 atmospheres.

Upon leaving the advanced polymerization stage, the final polymer is obtained, and the remaining water of reaction, from 30 to 40% of the total is removed. The reaction in the advanced polymerization stage depends on temperature, so that the higher the temperature, the less time is required in the advanced polymerization stage.

The series of runs were made in extruder reactors constructed in accordance with the polymerization process of the present invention. The extruder reactor used in carrying out the runs of this invention were Werner-Pfleiderer twin screw, co-rotating extruders with intermeshing screws. Each of the extruder chambers had a diameter of 28 mm and the nominal length of the process stage was as shown below in Table I, with the length being shown in mm, where Stage 1 is the feed stage, Stage 2 is the mixing stage, Stage 3 is the mass transfer stage, Stage 4 is the second mixing stage which is optional and Stage 5 is the advanced polymerization stage:

TABLE I

| Process Function | Stage | Length (mm) |
| --- | --- | --- |
| Feed | 1 | 90 |
| Mixing | 2 | 160 |
| Mass Transfer | 3 | 90 |
| Mixing | 4 | 60 |
| Advanced Polymerization | 5 | 90 |

A series of runs were made employing bisphenol-A and meta-phenylenediamine with 3% phthalic anhydride added as a chain stopper along with bisphenol-A.

The respective materials were heated to convert them to the molten state in accordance with the practice of the present invention and fed into the above-described Werner-Pfleiderer extruder as described above utilizing a feed pipe as shown in FIG. 2. Various screw designs were used to determine the optimum mixing factor prior to the mass transfer stage for producing polymer suitable for making higher molecular weight polyetherimide in subsequent stages of polymerization. Screw design 1 consisted of standard conveying elements and neutral kneading blocks which provided a mixing factor of 10,626. Screw design 2 was similar to design 1 with about half the neutral kneading blocks replaced with forward conveying kneading blocks and additional standard conveying elements which provided a mixing factor of 15,340. Screw design 3 was similar to design 2 but with a drastically shortened mixing stage and an extended mass transfer stage which provided a mixing factor of 7,238. Screw design 4 was similar to design two with added kneading blocks replacing standard conveying elements which provided a mixing factor of 22,440.

In addition to the above screw designs, the feed mixture was varied to determine the optimum ratio in parts by weight of the bisphenol-A dianhydride to the meta-phenylenediamine to achieve a maximum intrinsic viscosity of the resulting polyetherimide separated from the extruder. The phthalic anhydride chain stopper was introduced with the bisphenol-A dianhydride in a proportion of about 3% by weight based on the total weight of the resulting blend. The screw speed (rpm) of 200 was used in all of the runs. The following results were obtained using a ratio of 100 parts of the bisphenol-A dianhydride to 20 parts of the meta-phenylenediamine, where IV (dl/g) is the intrinsic viscosity of the polymer measured in chloroform at 25° C. and "Run Time" is the time the extruder was allowed to operate, producing polyetherimide under steady state process conditions.

TABLE II

| Screw Design | Mixing Factor | Run Time (Hr.) | Maximum IV(dl/g) |
| --- | --- | --- | --- |
| 1 | 10,626 | ¾ | 0.12 |
| 2 | 15,340 | ½ | 0.13 |
| 3 | 7,238 | 2 | 0.15 |
| 4 | 22,440 | 2 | 0.21 |

The above polyetherimide was further solution polymerized in ortho-chlorobenzene and the polyetherimide increased in intrinsic viscosity in the following manner:

TABLE III

| Screw Design | IV (dl/g) |
| --- | --- |
| 1 | 0.18 |
| 2 | — |
| 3 | 0.18 |
| 4 | 0.25 |

The results shown in Tables II and III indicate that had the extruder been longer in length, it would have provided polyetherimide directly from the extruder having a higher intrinsic viscosity. In addition, optimum polyetherimide polymerization was achieved using screw design 4 as having a mixing factor of 22,440 shows a significantly improved IV as compared to screw designs 1-3.

Additional studies were performed using the above 1-4 screw designs following the above procedure with additional bisphenol-A dianhydride-meta-phenylene ratios. The following results were obtained, where BPA-DA is bisphenol-A dianhydride, MPD is meta-phenylenediamine and parts are by weight:

TABLE IV

| Screw Design | Feed Ratio (parts) PBA-DA MPD | IV |
|---|---|---|
| 2 | 100:30 | 0.276 |
| 3 | 92:20 | 0.164 |
|   | 50:10 | 0.167 |
|   | 48:10 | 0.178 |
| 4 | 100:22 | 0.526 |

The above results show that a significant improvement in intrinsic viscosity is achieved utilizing a ratio of 100:22 for the BPA-DA:MPD feed ratio which is 1.06 moles of MPD per mole of BPA-DA as compared to the results shown in Table III indicating 1.04 mole of MPD per mole of BPA-DA. It was further found that the extruder torque was exceeded within 15 minutes using screw design 4 with the 100:22 blend. Although the 100:30 blend shown for screw design 2 provided a 0.276 intrinsic viscosity which resulted in exceeding the extruder torque within 7 minutes, it was found that this blend had a significant degree of cross linking as a result of the excess MPD used. Overall, the polyetherimide having the highest IV and best overall properties was made using screw design 4 having a mixing factor of 22,440 with a feed ratio of about 1.04 mole of meta-phenylenediamine per mole of bisphenol-A dianhydride.

The extruder which can be employed in the practice of the present invention can be any of the extruders generally used for extrusion of plastic materials, but is, preferably, a multi-screw extruder. In that regard, the extruder can have co-rotating screws, and those screws can be tangential or intermeshing. In addition, the extruder can be of the type of device presently marketed under the trade name "Ko-kneader". In fact, though not preferred, the complete extruder as employed in the present invention can be a combination of these types. Obviously, this combination type extruder is not preferred because of the difficulties in assembling and coordinating the various steps.

Although the above examples are directed to only a few of the very many variables within the scope of the method of the present invention, it should be understood that the present invention is directed to the production of a much broader variety of polyetherimide using the organic dianhydride of formula (1) and organic diamine of formula (2) with an extruder having stages as shown in FIG. 1.

What we claim as new and desire to secure by Letters Patent of the United States is:

1. A process for making polyetherimide in a continuous manner which comprising
    (1) feeding molten aromatic bis(ether anhydride) and molten organic diamine into an extruder to produce a plural phase viscous melt,
    (2) conveying the plural phase liquid mixture of (1) to a mixing stage which effects a high degree of contact between the molten aromatic bis(ether anhydride) and molten organic diamine to produce a substantially uniform viscous melt as a result of intense kneading of the ingredients of the mixture,
    (3) conveying the resulting viscous melt of (2) to a mass transfer stage, where water of reaction is separated from the surface of the partially polymerized polyetherimide melt,
    (4) thereafter conveying the resulting melt to high shear and intensive mixing at a temperature in the range of from 250° C. to 350° C. and a pressure of from 1 to 5 atmospheres, and
    (5) separating high molecular weight polyetherimide therefrom along with the removal of final water of reaction, 2. A process in accordance with claim 1, where the polyetherimide resulting from the continuous steady state polymerization of the aromatic bis(ether anhydride) and organic diamine has an intrinsic viscosity in chloroform of at least 0.4.

3. A process in accordance with claim 1, where the polyetherimide consists essentially of chemically combined units of the formula

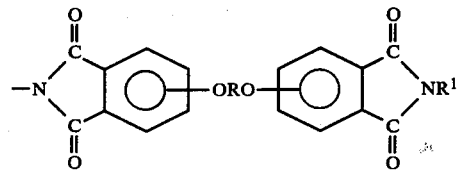

where R is a member selected from

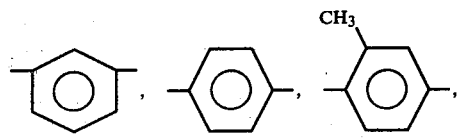

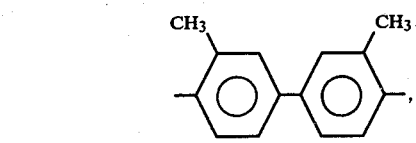

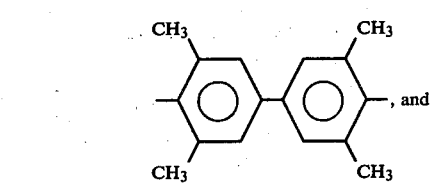

and divalent organic radicals of the general formula,

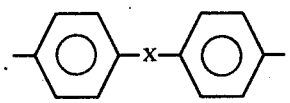

X is a member selected from the class consisting of divalent radicals of the formula,

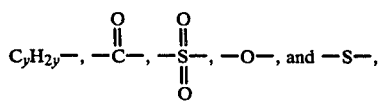

y is an integer from 1 to 5; and $R^1$ is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

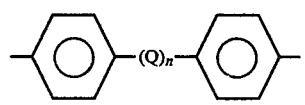

Q is a member selected from the class consisting of

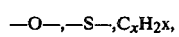

x is an integer from 1 to 5 and n is 0 or 1.

4. A method in accordance with claim 1, where the aromatic bis(ether anhydride) has the formula,

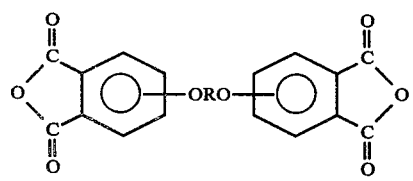

where R is a member selected from

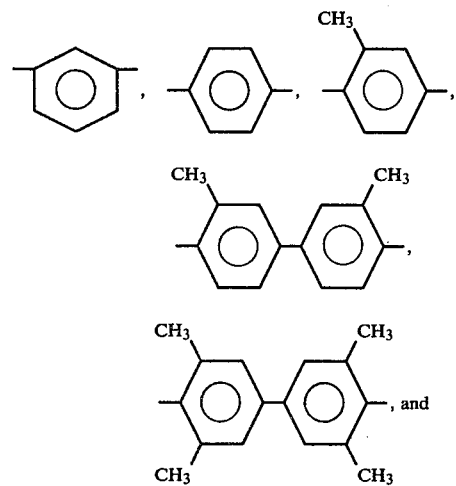

and divalent organic radicals of the general formula,

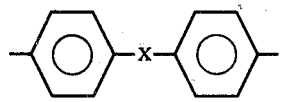

X is a member selected from the class consisting of divalent radicals of the formula,

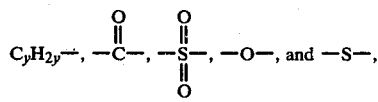

and y is an integer from 1 to 5.

5. A method in accordance with claim 1, where the aromatic bis(ether anhydride) is a mixture of

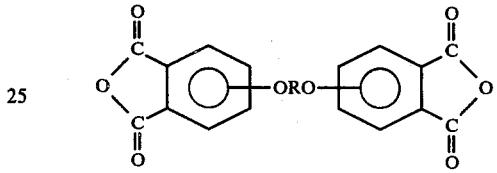

and up to 30 mole percent of benzophenone dianhydride, where R is a member selected from

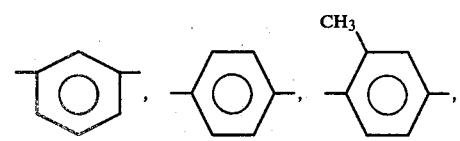

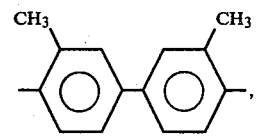

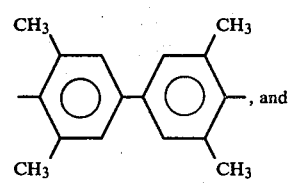

and divalent organic radicals of the general formula,

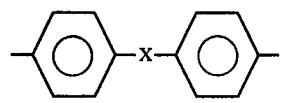

X is a member selected from the class consisting of divalent radicals of the formula,

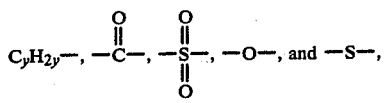

and y is an integer from 1 to 5.

6. A method in accordance with claim 1, where the organic diamine has the formula,

where $R^1$ is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

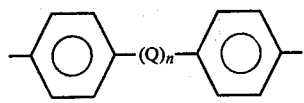

Q is a member selected from the class consisting of

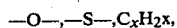

x is an integer from 1 to 5 and n is 0 or 1.

7. A method in accordance with claim 1, where there is utilized an effective amount of a chain stopper.

8. A continuous polymerization process in accordance with claim 1, where there is utilized a ratio of from about 1.0 to 1.5 mole of organic diamine per mole aromatic bis(ether anhydride) in the feed mixture.

9. A continuous polymerization process in accordance with claim 1, where the extruder is operated during the mixing of the molten feed mixture of aromatic bis(ether anhydride) and organic diamine to provide a mixing factor of from 1 to 100,000.

10. A process for the continuous steady state polymerization of polyetherimides comprising
  (1) separately metering into an extruder an aromatic bis(ether anhydride) melt and an organic diamine melt in a preselected proportion to produce a plural phase molten blend under an inert atmosphere in the feed stage of the extruder, said feed stage being provided with melt conveying elements,
  (2) conveying the blend from said feed stage to a mixing stage of said extruder where viscous heating is accomplished and the components of said blend are partially polymerized,
  (3) conveying said liquid, partially polymerized polyetherimide to a mass transfer stage of said extruder, melt pool acceleration being accomplished in said mass transfer stage, and water of reaction being removed in said stage,
  (4) conveying said partially polymerized polyetherimide from said mass transfer stage to a second mixing stage of said extruder, melt pool deceleration and further polymerization of said polyetherimide being accomplished in said second stage,
  (5) conveying said further polymerized polyetherimide from said second mixing stage to an advanced polymerization stage where complete polymerization of said polyetherimide is accomplished with extended residence time, and
  (6) removing a high polymer polyetherimide from said advanced polymerization stage with removal of final water of reaction.

11. The process of claim 10 wherein from 60 to 70% of the water of reaction is removed in said mass transfer stage and from 30 to 40% of said water of reaction is removed upon removal of the high polymer from said advanced polymerization stage.

12. The process of claim 10 wherein the elements in said first mixing stage of said extruder are zero and forward conveying kneading blocks.

13. The process of claim 12 wherein the temperature in said first mixing stage is raised to from 200° to 350° C. at a pressure of 2 to 6 atmospheres.

14. The process of claim 13 wherein the temperature is maintained at from 250° to 350° C. at the pressure is maintained at from 2 to 3 atmospheres.

15. The process of claim 10 wherein the elements in said mass transfer stage are open and medium pitch, forward conveying elements.

16. The process of claim 15 wherein the temperature in said mass transfer stage is maintained at from 250° to 325° C. at atmospheric pressure.

17. The process of claim 16 wherein the temperature is maintained at from 300° to 325° C.

18. The process of claim 10 wherein the elements in said second mixing stage are tight pitch forward conveying elements.

19. The process of claim 18 wherein the temperature in said second mixing stage is maintained at from 250° to 350° C. and the pressure is maintained at from 1 to 2 atmospheres.

20. The process of claim 19 wherein the temperature is maintained at from 300° to 350° C.

21. The process of claim 10 wherein the elements in said advanced polymerization stage of said extruder are tight pitch, forward conveying elements and said stage is provided with a restricted exit.

22. The process of claim 21 wherein the temperature in said advanced polymerization stage is maintained at from 300° to 400° C. and the pressure is maintained at from 1 to 50 atmospheres.

23. The process of claim 22 wherein the temperature is from 325° to 400° C. and the pressure is from 1 to 25 atmospheres.

24. The process of claim 10 wherein said extruder has two screws, said screws being co-rotating and intermeshing.

25. The process of claim 10 wherein the temperature of said first melt and said second melt are approximately 210° C.

26. The process of claim 10 wherein the said second mixing stage and said advanced polymerization stage are combined into a single process stage.

27. The process of claim 26 wherein the temperature and pressure in the combined said final stage are 250°–400° C. and 1–25 atmospheres.

* * * * *